Patented June 23, 1936

2,044,861

UNITED STATES PATENT OFFICE 2,044,861

MUSHROOM SPAWN AND METHOD OF MAKING IT

James W. Sinden, State College, Pa., assignor to The Pennsylvania Research Corporation, State College, Pa., a corporation of Pennsylvania No Drawing. Application September 18, 1935, Serial No. 41,179

6 Claims. (Cl. 47—1)

This invention relates to mushroom spawn and to an efficient method of growing it. By mushroom spawn is meant spawn of the various species of the genus Agaricus or Psalliota, commonly known collectively under the name *Agaricus campestris*.

Heretofore mushroom spawn has been made by preparing a culture medium or substrate which is inoculated with the mycelium of the mushroom. The culture or spawn is carefully grown under incubating conditions and when the mycelium has grown throughout the substrate it is then broken up and used to plant the beds for growing mushrooms.

For many years the only substrate employed to grow mushroom spawn was prepared manure from horses. This substrate was difficult and expensive to prepare and handle and the spawn was often unsatisfactory. As set forth in my United States Patent No. 1,869,517, many of the objectionable features of prior practices are avoided or overcome by employing a cereal substrate made, for example, from hominy, cracked wheat, whole grain wheat, barley, rye, oats, rice, etc. Other seeds such as clover, bean, pea or even ground-up corn cobs are included by the term cereal substrate.

The present invention comprises an improvement upon the invention covered in my identified patent, and is predicated upon my discovery that the speed of growth of the spawn is accelerated, the quality improved, and the quantity of growth increased by adding a small amount of a calcium salt to the cereal substrate.

It has been proposed to retain a substrate neutral by the addition of alkalies to a tobacco stem substrate. I have discovered, however, that retaining cereal substrate neutral is not important in my invention, because alkaline salts of sodium, potassium and magnesium do not increase the spawn growth rate, although they change the acid or base reaction. Moreover, calcium salts, such as calcium chloride, cause improved growth in cereal substrate while not noticeably changing the alkaline reaction. On the other hand the addition of alkaline salts of sodium, potassium and magnesium to a tobacco stem substrate produces no greater or less spawn growth than the addition of an alkaline calcium salt.

This fact has led me to believe that tobacco stem substrate and cereal substrate not only react differently to spawn growth, but that alkalinity control is not important to accelerate mycelial development in cereal substrate. It is probable that the phosphate metabolism of the fungus growing in the cereal substrate is affected, since calcium controls the intake and utilization of phosphate in both plants and animals.

It is the general object of my invention to provide an improved method of growing mushroom spawn wherein the time required for growing the spawn is materially reduced, the quantity increased, and the quality improved.

Another object of the invention is to provide an improved mushroom substrate and a healthy spawn better adapted for rugged mushroom growth and for storage until planted.

The foregoing and other objects of the invention are achieved by adding a calcium salt to a cereal substrate of the general type disclosed and claimed in my above-identified patent. The calcium salt is added before sterilization of the substrate, and in amounts between about 1 to 3 parts by weight per 100 parts by weight of substrate.

Various calcium salts may be used, such as calcium chloride, calcium nitrate, calcium hydroxide, or calcium carbonate. Preferably, it is advisable to use a calcium salt which is not very soluble so that most of the salt remains as a reserve material not involved in the chemical process but available as the dissolved portion is exhausted or combined. Thus the conditions in the substrate are maintained substantially constant over the period of time required to grow the spawn. With more soluble salts the osmotic concentration maximum for mycelial growth is attained with too low a concentration of the salt which concentration varies as the salt is used.

Of the various calcium salts, calcium carbonate is preferred and while it is alkaline in reaction it is very slightly soluble and in the amounts added it has relatively little effect on the reaction of the spawn medium. Generally the calcium carbonate as used is in the form of precipitated chalk.

After the calcium salt has been added to the substrate the process of sterilization is performed and the substrate is inoculated and the spawn grown as described in detail in my above-mentioned patent and as set forth briefly heretofore.

The most important effect of the addition of the calcium salt to the cereal substrate is the very great increase in rate and amount of mycelial development. Heretofore about twenty-one to twenty-eight days were required to grow the spawn, but by employing the principles of my present invention only about ten to fourteen days are necessary. This saving is very important commercially as it provides a faster turnover of growing containers and makes the storage of spawn largely unnecessary so that the demand can be more promptly supplied and more readily predicted on shorter growing time. The total supply of spawn on hand, finished or in process at any one time, need not be greater than is necessary to supply the market for three or four weeks. This gives the mushroom grower the freshest possible spawn for planting in his beds.

Not only does the spawn grow faster when my improvements herein described are employed, but the spawn grows more abundantly and it is more rugged and better able to withstand storage until used.

I have also found that the spawn grown in cereal substrate containing a calcium salt is equivalently drier at the surface of the grains for a given water content than the usual spawn. Therefore the spawn has less tendency to stick together and to a container, and it can more readily be broken up to facilitate planting.

While in accordance with the patent statutes specific examples of my invention have been described in detail, it should be understood that the scope of the invention is not limited thereto or thereby but is defined in the appended claims.

I claim:

1. That method of growing mushroom spawn which comprises preparing a cereal substrate, adding about 1 to about 3 parts by weight of a slightly soluble calcium salt to the substrate for every 100 parts by weight of the substrate, sterilizing the mixture, inoculating the substrate by the introduction of a mushroom culture and incubating until the substrate is overgrown with mycelium.

2. That method of growing mushroom spawn which comprises preparing a cereal substrate, adding a calcium salt to the substrate, sterilizing the mixture, inoculating the substrate by the introduction of a mushroom culture and incubating until the substrate is overgrown with mycelium.

3. The method of growing mushroom spawn which includes the steps of preparing a cereal substrate, mixing a calcium-bearing material in the substrate and inoculating the substrate with a mushroom mycelium.

4. Mushroom spawn comprising a mycelium-inoculated cereal substrate including about 1 to about 3 parts by weight of a calcium salt to 100 parts by weight of the substrate.

5. A substrate for growing mushroom spawn comprising cereal and a calcium salt.

6. A substrate for growing mushroom spawn comprising cereal and a relatively small amount of calcium carbonate.

JAMES W. SINDEN.